United States Patent
Meissner et al.

(10) Patent No.: US 10,248,408 B2
(45) Date of Patent: Apr. 2, 2019

(54) HANDLING TABLE DELTAS DURING ZERO DOWNTIME UPGRADE

(71) Applicants: Steffen Meissner, Heidelberg (DE); Juergen Specht, Gerabronn (DE)

(72) Inventors: Steffen Meissner, Heidelberg (DE); Juergen Specht, Gerabronn (DE)

(73) Assignee: SAP SE, Walldorf (DE)

( * ) Notice: Subject to any disclaimer, the term of this patent is extended or adjusted under 35 U.S.C. 154(b) by 541 days.

(21) Appl. No.: 14/490,529

(22) Filed: Sep. 18, 2014

(65) Prior Publication Data
US 2016/0085542 A1   Mar. 24, 2016

(51) Int. Cl.
*G06F 17/30* (2006.01)
*G06F 8/656* (2018.01)

(52) U.S. Cl.
CPC .......... *G06F 8/656* (2018.02); *G06F 17/303* (2013.01); *G06F 17/30292* (2013.01); *G06F 17/30575* (2013.01); *G06F 17/3023* (2013.01)

(58) Field of Classification Search
None
See application file for complete search history.

(56) References Cited

U.S. PATENT DOCUMENTS

| | | | |
|---|---|---|---|
| 2008/0098046 A1* | 4/2008 | Alpern | G06F 17/30306 |
| 2012/0124081 A1* | 5/2012 | Ebrahimi | G06F 17/30569 707/769 |
| 2014/0143284 A1* | 5/2014 | McCaffrey | G06F 17/30297 707/803 |
| 2015/0106140 A1* | 4/2015 | Biewald | G06Q 10/0631 705/7.12 |
| 2015/0142728 A1* | 5/2015 | Nigam | G06F 8/65 707/609 |

* cited by examiner

*Primary Examiner* — Rehana Perveen
*Assistant Examiner* — Raheem Hoffler
(74) *Attorney, Agent, or Firm* — Mintz Levin Cohn Ferris Glovsky and Popeo, P.C.

(57) ABSTRACT

A zero downtime upgrade of a source system to a target system is initiated. The source system and the target system operate in a first database layer and a second database layer. Thereafter, differences in structure and/or database type are computed between a source table in the source system and a target table in the target system in each of the two different database layers. The data is then migrated, using the computing differences and in the second database layer, from the source table to the target table. The upgrade procedure is later terminated after completion of the migration of the data. Related apparatus, systems, techniques and articles are also described.

16 Claims, 13 Drawing Sheets

Before Upgrade

Upgrade: Delta Import & Migration

HANDLING TABLE DELTAS DURING ZERO DOWNTIME UPGRADE

TECHNICAL FIELD

The subject matter described herein relates to the handling of table deltas (i.e., differences, etc.) during zero downtime upgrades on the database/SQL layer.

BACKGROUND

Deployment of maintenance packages to computing platforms often require downtime of such platforms. At the beginning of downtime, a backup is created and this backup serves as a fallback option, in case the upgrade fails. Advancements in technology have enabled for reduced, and in some cases, zero downtime upgrades. With such arrangements, upgrades run in parallel to a production system within the same database for the complete duration of the upgrade. The procedure creates clones of the tables, which are changed by the upgrade and runs database triggers to replicate data from production to the upgrade copy of the tables. With the maintenance procedure running in parallel with the production system in the same database, the upgrade can no longer be revoked by restoring a backup.

A restore of a backup is usually done as a point-in-time recovery: the full backup is restored, then the re-do-logs of the changes done to the system between the point in time of the full backup and the point in time, the administrator wants to restore are rolled forward. Such restores can only be run for the complete database.

In some database systems such as ABAP, database tables are defined in data dictionaries (DDICs). With such systems, tools can be used to compute the table structure for the underlying database. Some database systems use several databases as part of a single system. For example, there can be a database abstraction layer and database specific modules to compute database types to be used to represent table definitions. A DDIC type must be represented by a database data type, but there is no standard for database data types, so the mapping is required and is specific to a particular database. Furthermore, such mapping may vary over time (e.g. in cases when the database provides a new type as part of a new database release and this type is then used in the mapping).

With ABAP systems, table conversions are typically done using ABAP tools. The database table content is read from the database to ABAP and converted to a new structure in ABAP and then written to a new DB table. ABAP provides some additional logic for the structure conversion known as the ABAP command "MOVE CORRESPONDING". This function depends on the metadata provided by ABAP.

On database layer, the metadata is not accessible in the database catalog. There are several ABAP types mapped to the same database types, but their conversion behavior depends on the ABAP definition, not only on the database definition.

EXAMPLE

ABAP type CHAR5 is a VARCHAR(5) on the database. This can hold any kind of characters. It is left aligned.
ABAP type NUMC5 is a VARCHAR(5) on the database. This can hold only numbers. It is right aligned.
To convert ABAP CHAR5 to CHAR10, the field on the database must only be made longer. To convert ABAP NUMC5 to NUMC10, the field on the database must be made longer, but also the content needs to be adjusted, the old string "00012" is to be transformed to "0000000012". Right aligned and filled with "0" from the left.

With zero downtime upgrades, a database conversion is only done using the live clone, if the DB type mapping can be done by the database automatically with built-in DB type conversion (e.g. INT to BIGINT). The complex conversions are left to the ABAP conversion. With zero downtime upgrades, this arrangement leads to the table being put to read-only for the duration of the conversion. This arrangement can impact production as write accesses are not possible during such time periods.

Database types do not necessarily provide a database default value (e.g. RAW, RSTRING, . . . ) but the ABAP system writes a default string to the field. During a conversion the new table must be filled with the string as well. An insert of the old record to the new table does not provide the correct content as it would have written by ABAP. Therefore, a zero downtime maintenance procedure cannot use ABAP to do table conversions without downtime.

SUMMARY

In one aspect, a zero downtime upgrade of a source system to a target system is initiated. The upgrade procedure prepares software for the target system in parallel to operation of the source system by selectively (i) cloning, for the target system, tables and associated database triggers used by the source system according to a source database schema, (ii) generating new target tables comprising updated software content for use by a bridge database schema, and (iii) selectively sharing tables between the source database schema and the bridge database schema. The source system and the target system operate in a first database layer and a second database layer. Thereafter, differences in structure and/or database type are computed between a source table in the source system and a target table in the target system in each of the two different database layers. The data is then migrated, using the computing differences and in the second database layer, from the source table to the target table. The upgrade procedure is later terminated after completion of the migration of the data.

The first layer can be an Advanced Business Application Processing (ABAP) language layer. The differences can be computed by accessing an ABAP data dictionary (DDIC) to identify a structure of the source table in the first layer. The second layer can be a database layer. The database layer can use Structured Query Language (SQL) for managing data.

The migrating can implicitly convert the data of the source table on the second layer. The migrating can use a conversion function to convert the data of the source table on the second layer.

In an interrelated aspect, differences in structure and/or database type between a source table in a source system and a target table in a target system are computed in an Advanced Business Application Programming (ABAP) layer and in a database layer. Thereafter, data is migrated, using the computed differences and in the database layer, from the source table to the target table. With such an arrangement, the migration can occur independently of a zero downtime upgrade procedure, or in some cases, as part of a zero downtime upgrade procedure.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, the current subject matter can manage database conversions using stored procedures and explicit database type conversion functions. With this arrangement, more table conversions can be handled without requiring tables to be in read-only mode which, in turn, has a smaller impact on production. Furthermore, the current subject matter can be used for a wide variety of databases for upgrade scenarios as well as other operations for which a database tables requires changing such as support packages, patches, customer changes, legal changes, database version upgrades, and the like.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter relates to an improved zero downtime upgrade procedures which can be used with various downtime maintenance/upgrade procedures such as that described in U.S. Pat. No. 8,200,634 entitled: "Zero downtime maintenance using a mirror approach", the contents of which are hereby fully incorporated by reference.

Figure 1:
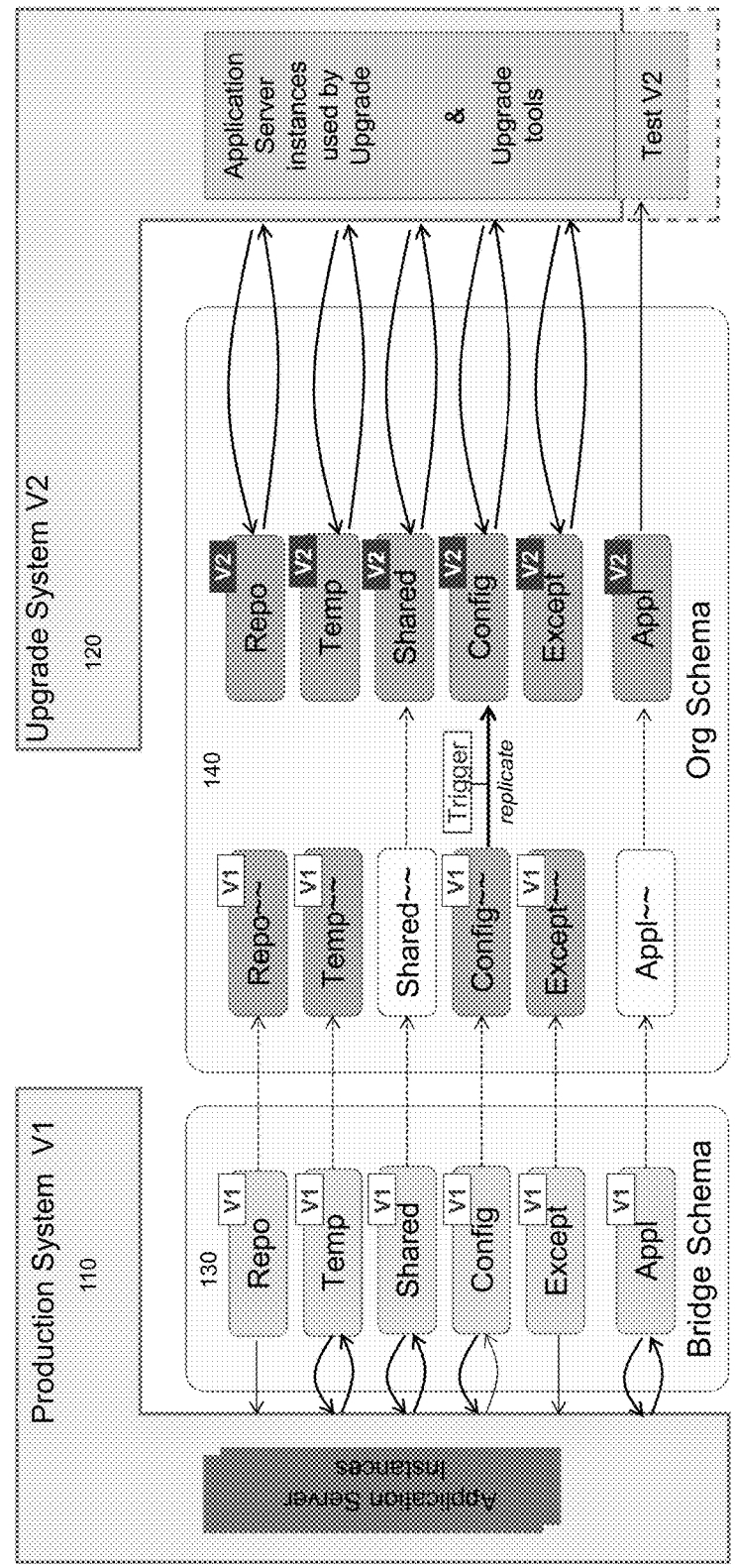
FIG. 1 is a first diagram illustrating a zero downtime upgrade procedure.

FIG. 1 is a diagram 100 illustrating a process of a zero downtime upgrade of a production system 110 (sometimes referred to as a source system) to an upgrade system 120 (sometimes referred to as a target system). The production system 110 runs various application server instances executing a first version of software (as indicated by the designation V1) and the upgrade system 120, when upgraded, runs various application server instances running a second version of software (as indicated by the designation V2). As part of a zero-downtime upgrade from the production system 110 to the upgrade system 120, a bridge schema 130 provides various tables of data that are in turn used by an original schema 140 to generate/populate alias tables that, in turn, are used to generate tables that are ultimately used by the upgrade system 120. In some cases, the upgrade system 120 can be tested prior to going live. Further details are provided below.

Figure 2:
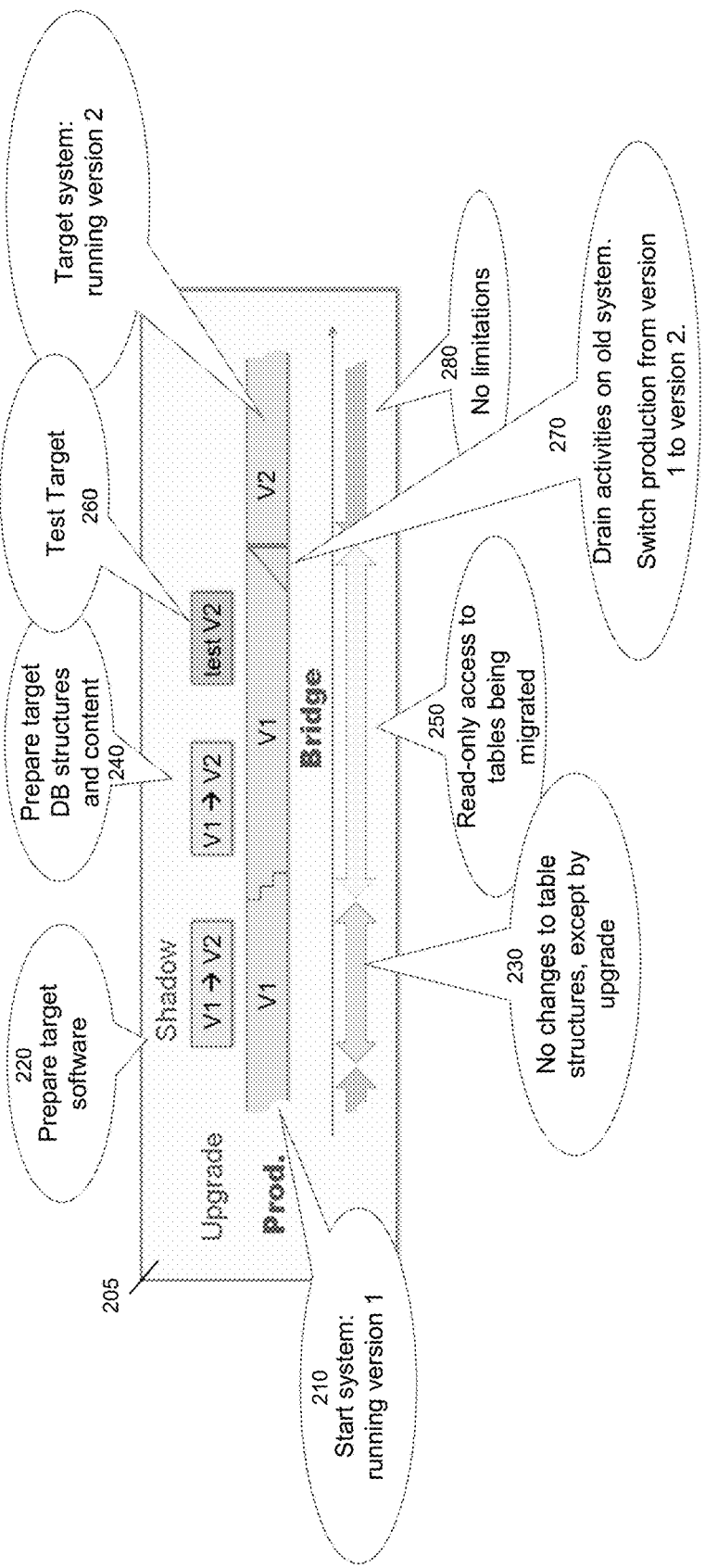
FIG. 2 is a first diagram illustrating a zero downtime upgrade procedure.
Figure 3:
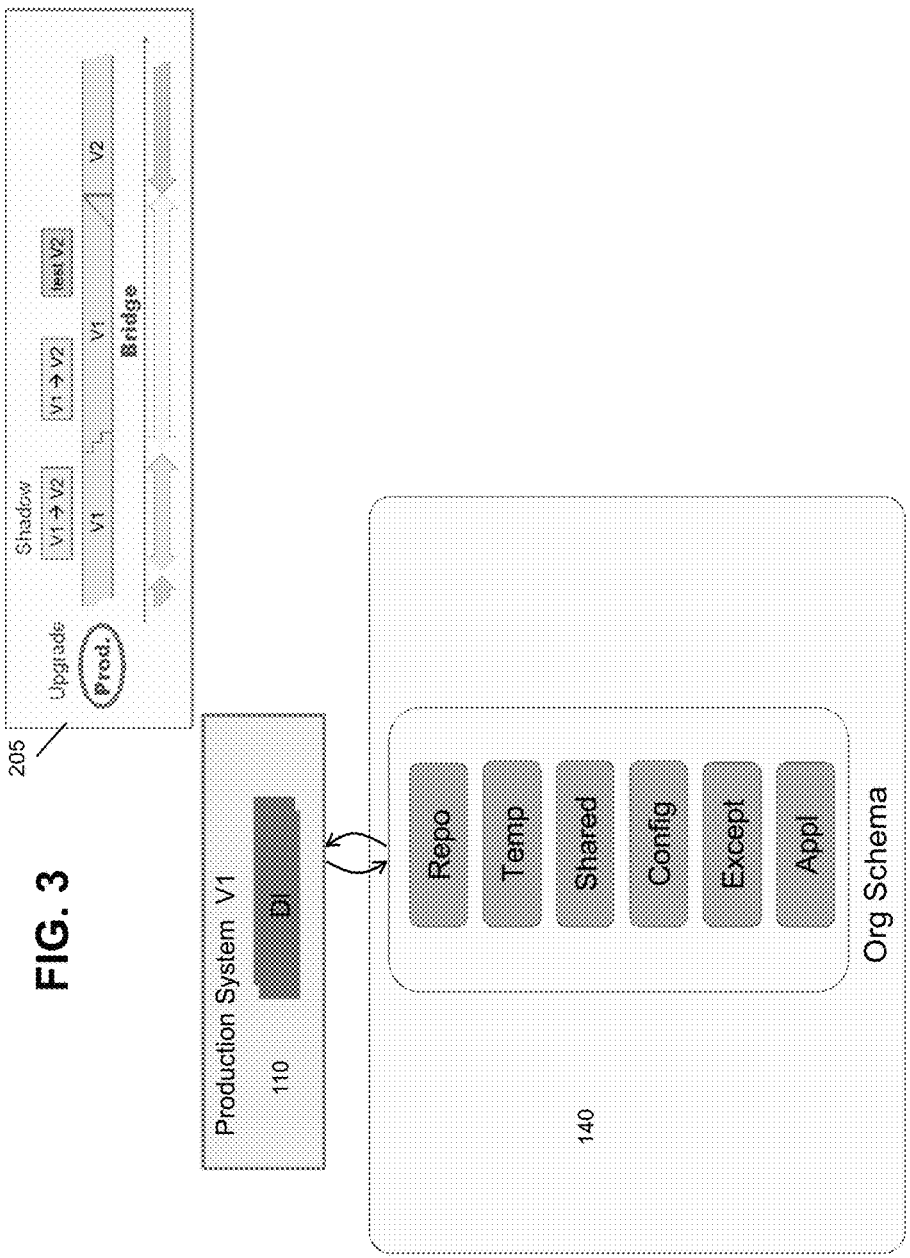
FIGS. 3-12 provide a sequence of a zero downtime upgrade procedure.

FIG. 2 is a diagram 200 providing an overview of a zero downtime upgrade process moving from version 1 (V1) software on a production system to version 2 (V2) software on the target system. With reference to the legend 205, at 210, the production system is initially running version 1 software. Subsequently, at 220, target software including (shadow tables) is prepared. No changes are made, at 230, to table structures except where upgrades require changes. Thereafter, at 240, target database structures and content are prepared. During such time, at 250, the tables being migrated are only accessible via read-only access. Prior to deployment, at 260, the target software can be tested. If the testing is successful, at 270, production is switched from version 1 to version 2 and, at 280, activities are drained/ceased on the old production system.

Stated differently, a zero downtime maintenance procedure can work by first generating upgrade scripts. Thereafter, revoke scripts can be generated. Next, the application upgrade package can be analyzed so that it can be derived which tables get content by the upgrade package, are changed in structure by the upgrade package (so that such tables can be categorized based on their treatment in the upgrade). In addition, the target software (i.e., the upgraded software) can be prepared in parallel to production use. The target database tables are also prepared. In case the table gets content, it is cloned: a copy can be created including all content and one or more triggers ensure the content remains up-to-date to changes. In cases in which a table's content is migrated, a copy of the table is created and the original table can be designated as read-only and a migration report can be run. Thereafter, the upgraded content is deployed to the cloned tables. After the target version is tested and confirmed to be working properly, users can be switched to the target version.

The zero downtime revoke procedure can work as follows. First, the upgrade instance can be stopped. Thereafter, persistent enqueue locks on the upgrade tables can be removed. Furthermore, entries and fields associated with the upgrade can be removed in shared tables. In cases in which a bridge table is used, the original table can be dropped. Thereafter, the tables can be switched from the bridge to the original. Old views on original tables can be created and the original instance can be started with a standard connect. Thereafter, users can be switched back to the original version and any remaining instances can be restarted with standard connect. Furthermore, any unused remainders of the upgrade can be removed.

The tables in the database can be sorted into various categories. First, there are the Config tables that receive the content for the upgrade. The Config tables can be cloned by creating a copy of the table and having a database trigger replicate all data from the table used by production to the table used by the upgrade to deploy new data. For the Config tables, the revoke procedure drops the table used by the upgrade. The table used by production is consistent in structure and content with respect to the start release. Furthermore, upon the switch of production to target version, the production is configured to use also the target table.

Another type of table does not receive content for the upgrade but their structure is adjusted (e.g., new fields are added, etc.). The access by production to such tables can be redirected to a projection view on the table. The view can include the same fields of the table's structure as of the start release version. Subsequently, these tables can be extended on the database level through the addition of new fields. The production can access this extended table There can additionally be tables that are not touched by the upgrade. That is, neither the structure nor the content of such tables are changed. With such tables, locks can be set, either for the complete table or for single rows.

Another type of table can be referred to as an Except table. With these tables, other types of changes are made that can be put to read-only for the bridge. For example, if a field is set to be longer, the table is then part of the Except category. These tables can be set to read-only for the production. A table with a different name can be created, but with the tables target structure. Thereafter, a batch job can be run, which transfers all data from the original table to the target table. Upon the switch of production to target version, the production can be configured to also use also target table.

For the revoke procedure, for the tables receiving convent by the upgrade (Config tables), the table used by the upgrade is dropped. The table used by production is consistent in structure and content with respect to the start release.

In addition, for tables not receiving content, the structure is adjusted (e.g., new fields are added) (some of the Appl tables). For these tables, the revoke procedure drops the additional columns. Afterwards, the access of production can be redirected to the table directly, no longer going through the view. Afterwards, the view can be dropped.

For tables not touched by the upgrade, neither in structure nor in content (remaining Appl tables), the locks on rows or on complete tables are dropped. Changes of other type are done to tables which are put to read-only for the bridge (Except tables) (e.g., a field is set to be longer, etc.).

Figure 4:
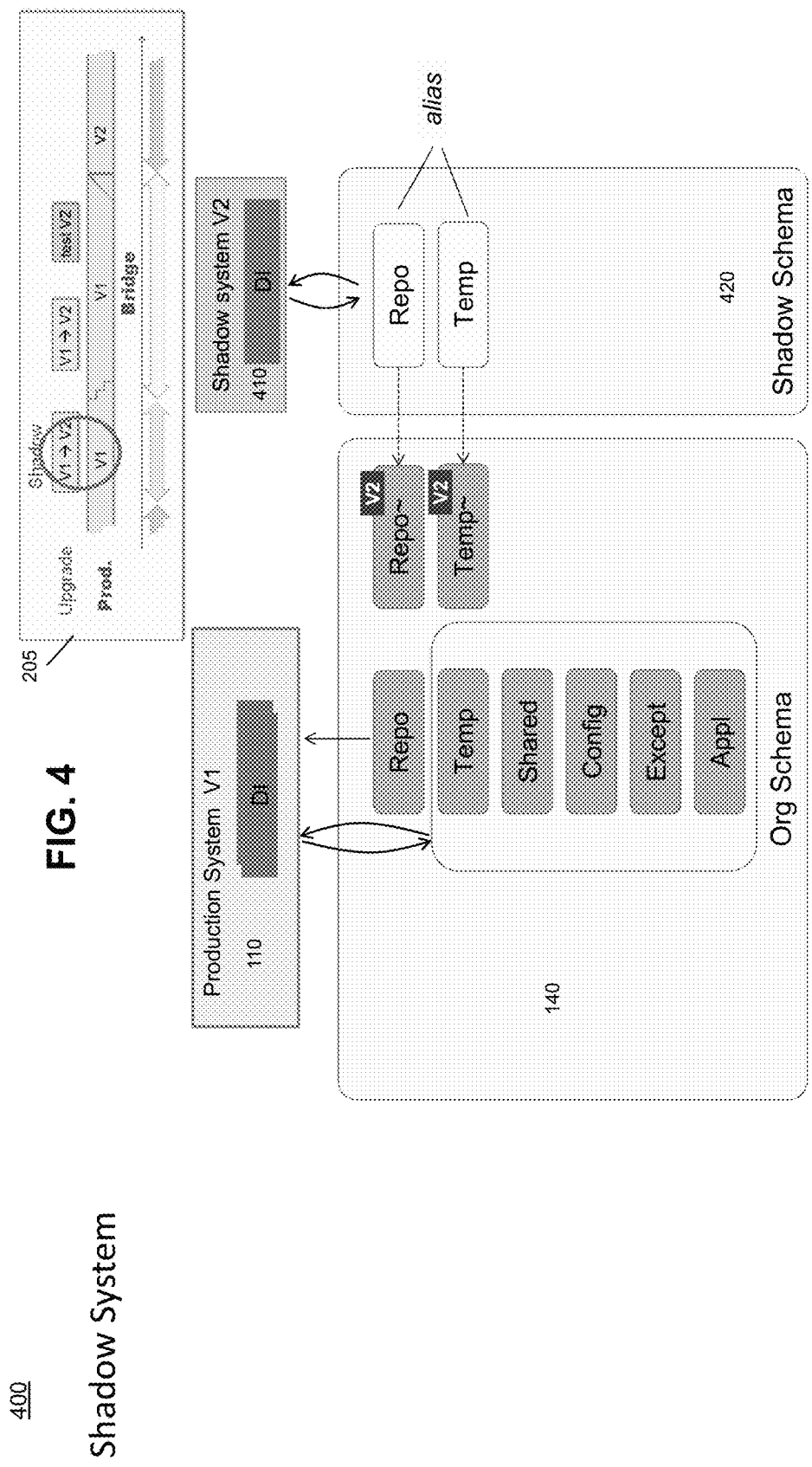

FIGS. 3-12 provide an overview zero downtime upgrade procedure. With reference to diagram 300 of FIG. 3, before the upgrade, user can use a dialog instance connected to a standard schema. Diagram 400 of FIG. 4 illustrates an uptime and shadow system period in which preparation checks are run. Maintenance mode is switched on (no changes to table structures except by upgrade). In addition, a shadow system 400 with shadow schema 410 is set up, the target software is deployed to tables "Repo~" and the target structures of the tables are computed. The shadow system is a mechanism to prepare the content in the shadow tables named TABLE~, e.g. for the repository content stored in Repo~. Details regarding the use of a shadow system can be found in U.S. Pat. No. 7,523,142 entitled: "Systems, methods and articles of manufacture for upgrading a database with a shadow system", the contents of which are hereby fully incorporated by reference. Changes brought by the upgrade can be analyzed to determine which tables for migration are to be cloned later. In addition, the content brought by the upgrade can be analyzed to determine which tables to later clone.

Figure 5:
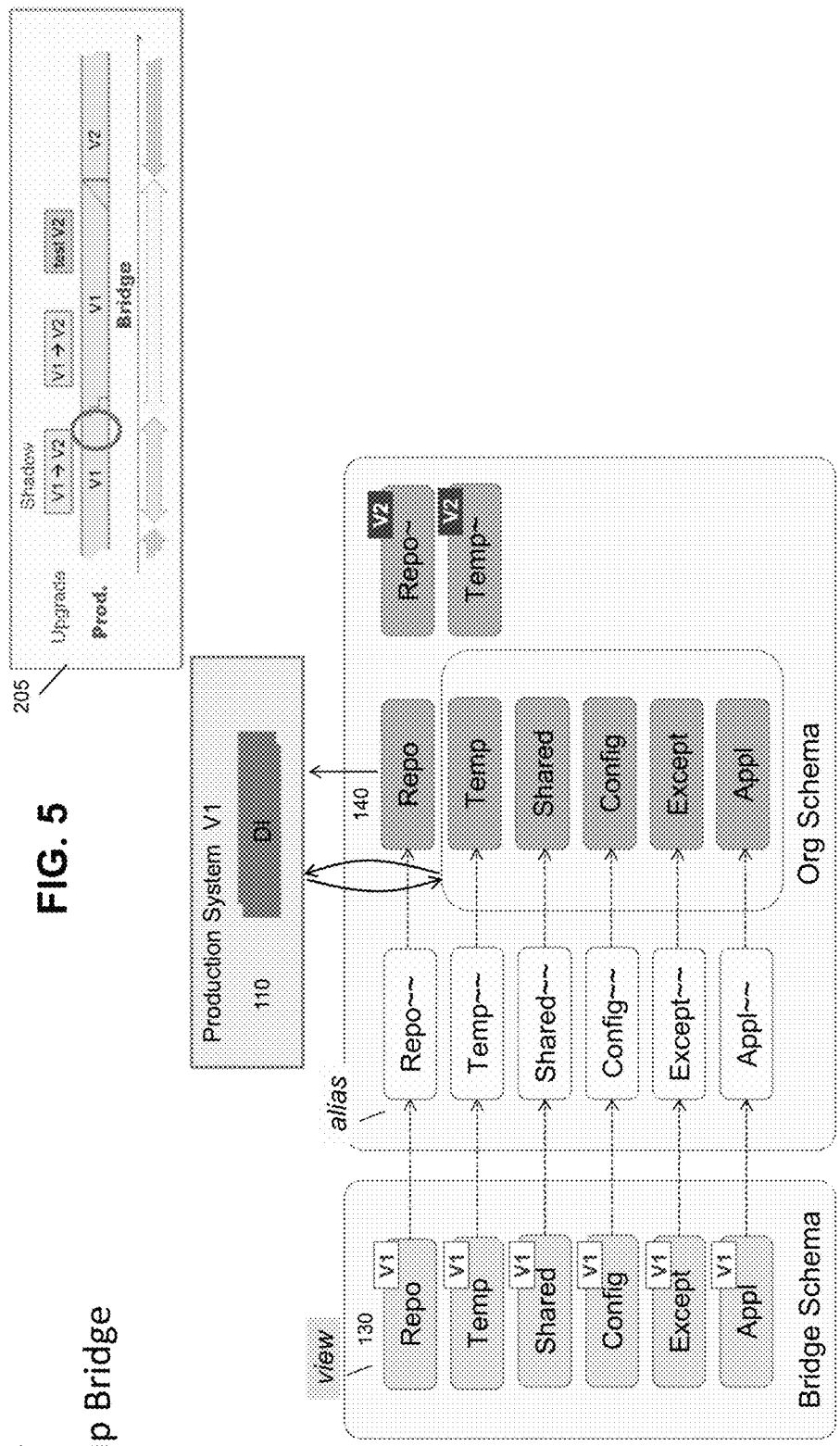

With reference to diagram 500 of FIG. 5, an alias "TABLE~~" for all tables "TABLE" is created. In addition, a second database schema "bridge schema" 130 can be created as well as a view "TABLE" for all aliases in the original schema "TABLE~~". Additionally, in the bridge schema a view is created for all tables, which do not have a TABLE~~ counterpart. The views have the structure of the tables of the start release.

Figure 6:
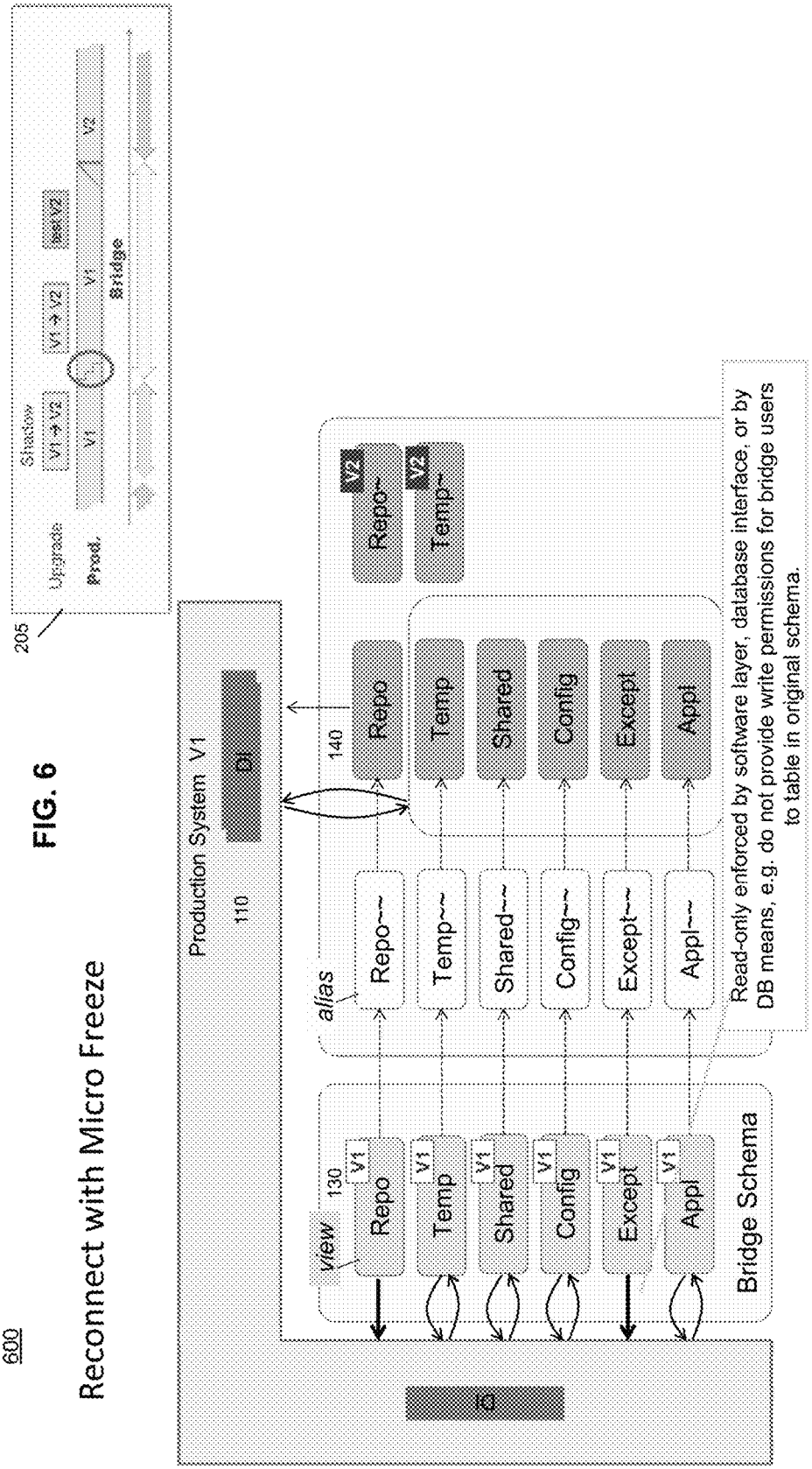

With reference to diagram 600 of FIG. 6, dialog instances can be reconnected from the original schema 140 to the bridge schema 130. The dialog instances "suspend" all actions by users, disconnect from the DB original schema 140 and connect to bridge schema 130. Further, as part of a bridge operation period, production runs on the production system 110 connected to the bridge schema and tables, which will be migrated later, are designated as read-only.

Figure 7:
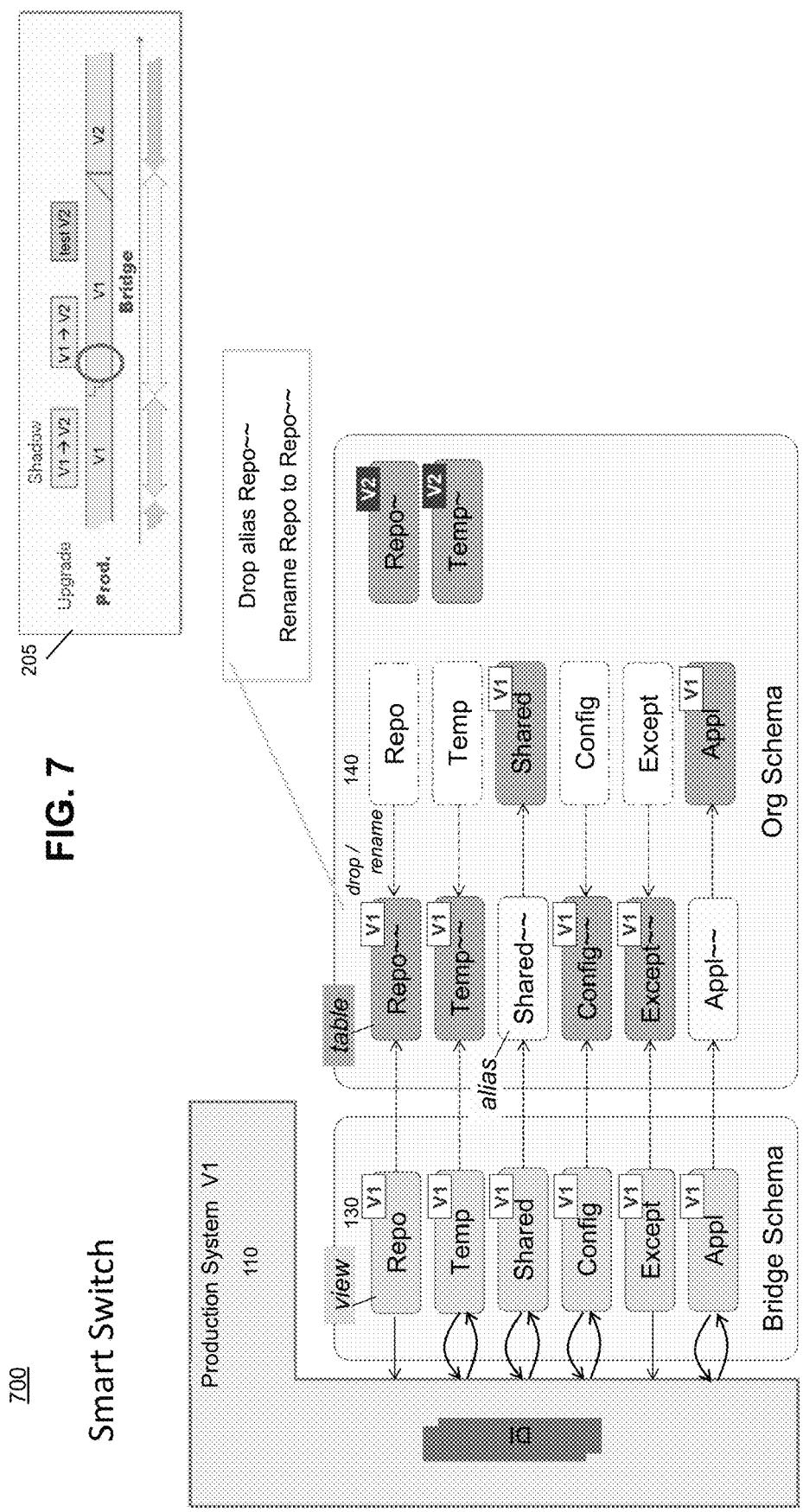

With reference to diagram 700 of FIG. 7, for a smart switch, for those tables that are switched from shadow ("Repo", "Temp") or cloned later, ("Config", "Except"), a smart switch is run. The smart switch causes the alias "Repo~~" to be dropped and the table "Repo" to be renamed to "Repo~~".

Figure 8:
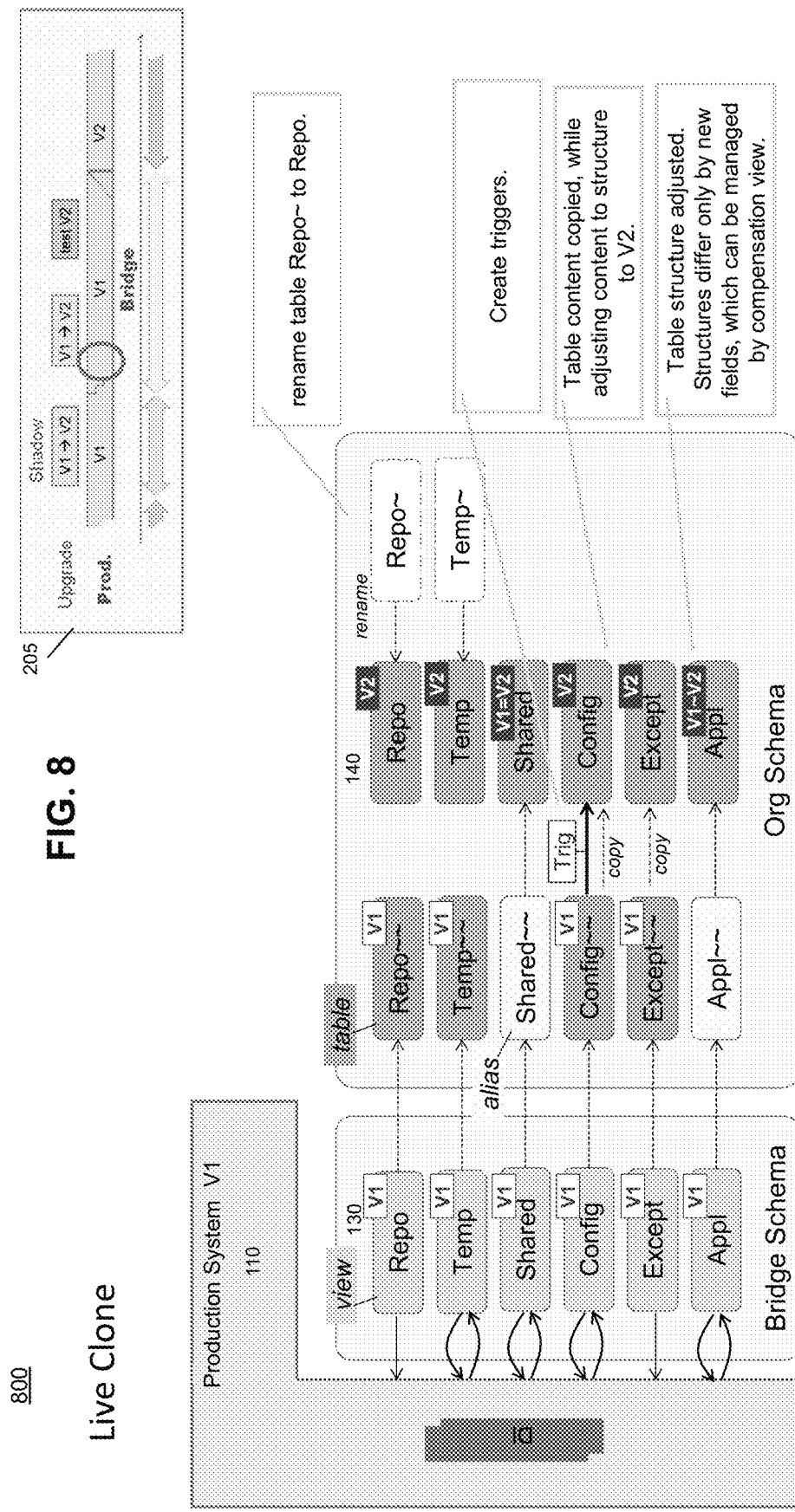

With reference to diagram 800 of FIG. 8, as part of a live clone process, the shadow tables are renamed ("Repo~", "Temp~") and Repo~ is renamed to Repo. The tables are created with the target structure ("Config", "Except"). A trigger is created for the "Config" tables, which transfers all changes done by production to Config~~ to Config. The unchanged data is then copied from Config~~ to Config. The tables, which are shared ("Share" and "Appl") are adjusted structure-wise. New fields can be added (with more complex structure change resulting in the table being in category "Except").

Figure 9:
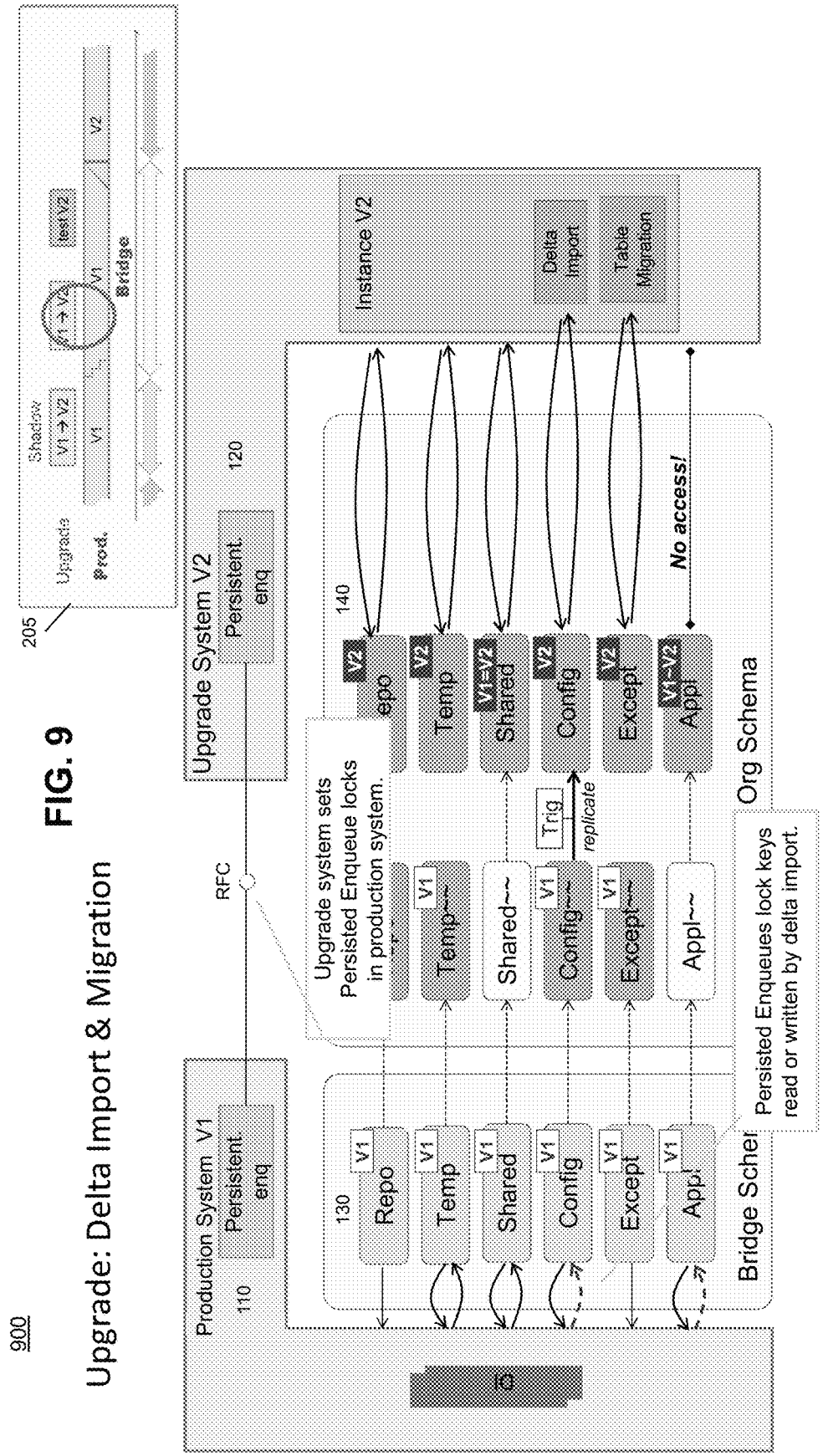

With reference to diagram 900 of FIG. 9, as part of delta import and table migration, the content brought by the upgrade is deployed to the config tables. The import of content can also be done by programs running in the application server. The tools create persistent enqueue locks in the production system for changed keys, where the production shall not change content any mode. For other changes, where production and upgrade change the same keys, the changes are not replicated, the upgrade wins.

Figure 10:
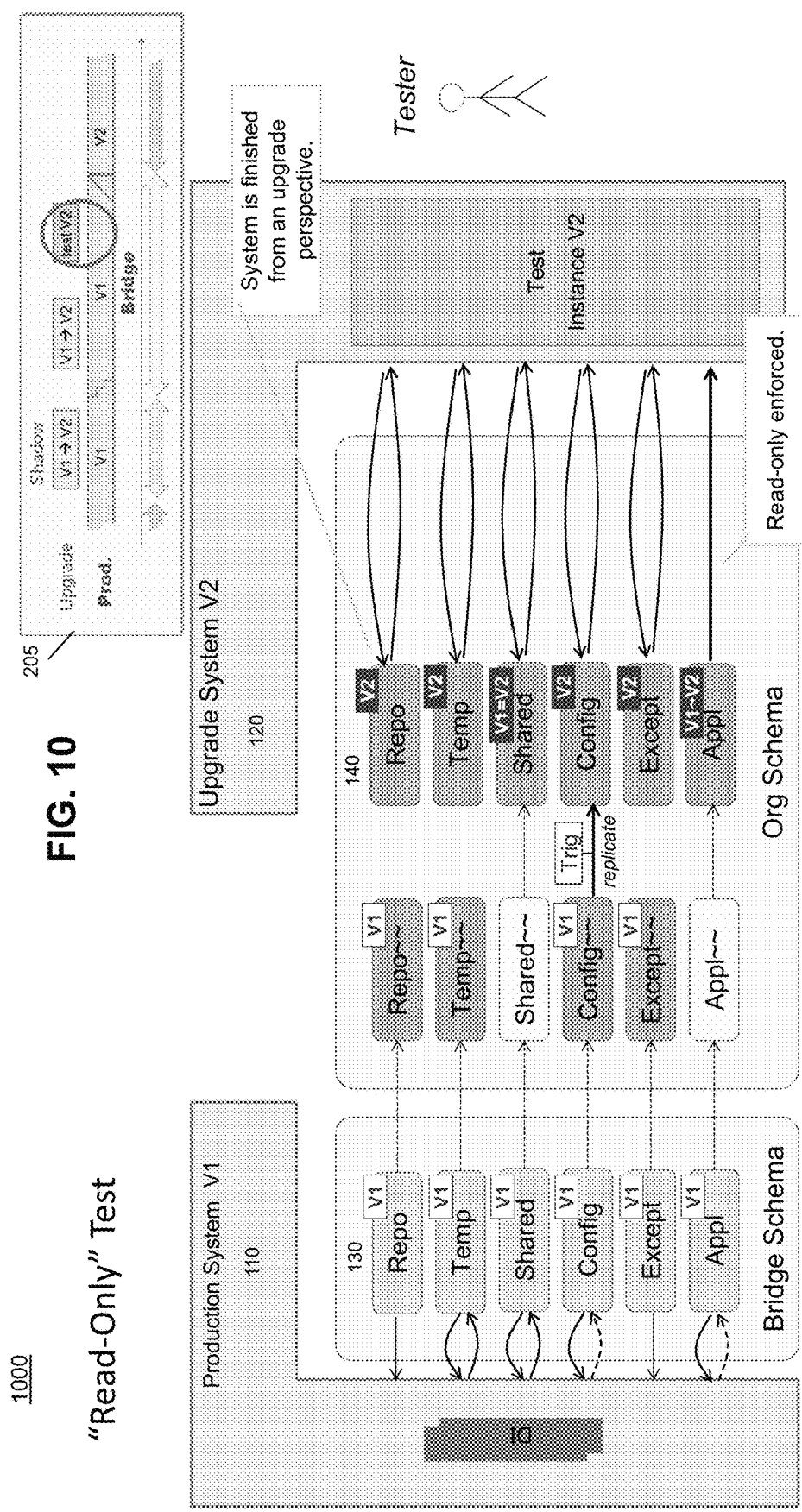

With reference to diagram 1000 of FIG. 10, for read-only tests, the application tables are equipped with freeze triggers. These triggers ensure, no content changes can be done by the database user of the original schema 140. The user of the bridge schema 130 can still change content. In addition, the dialog instances of the upgrade are started and opened for test users. Further, users can read all data, they can write data of category "Repo", "Config", "Share", "Temp" and "Exception". Application data cannot be changed.

Figure 11:
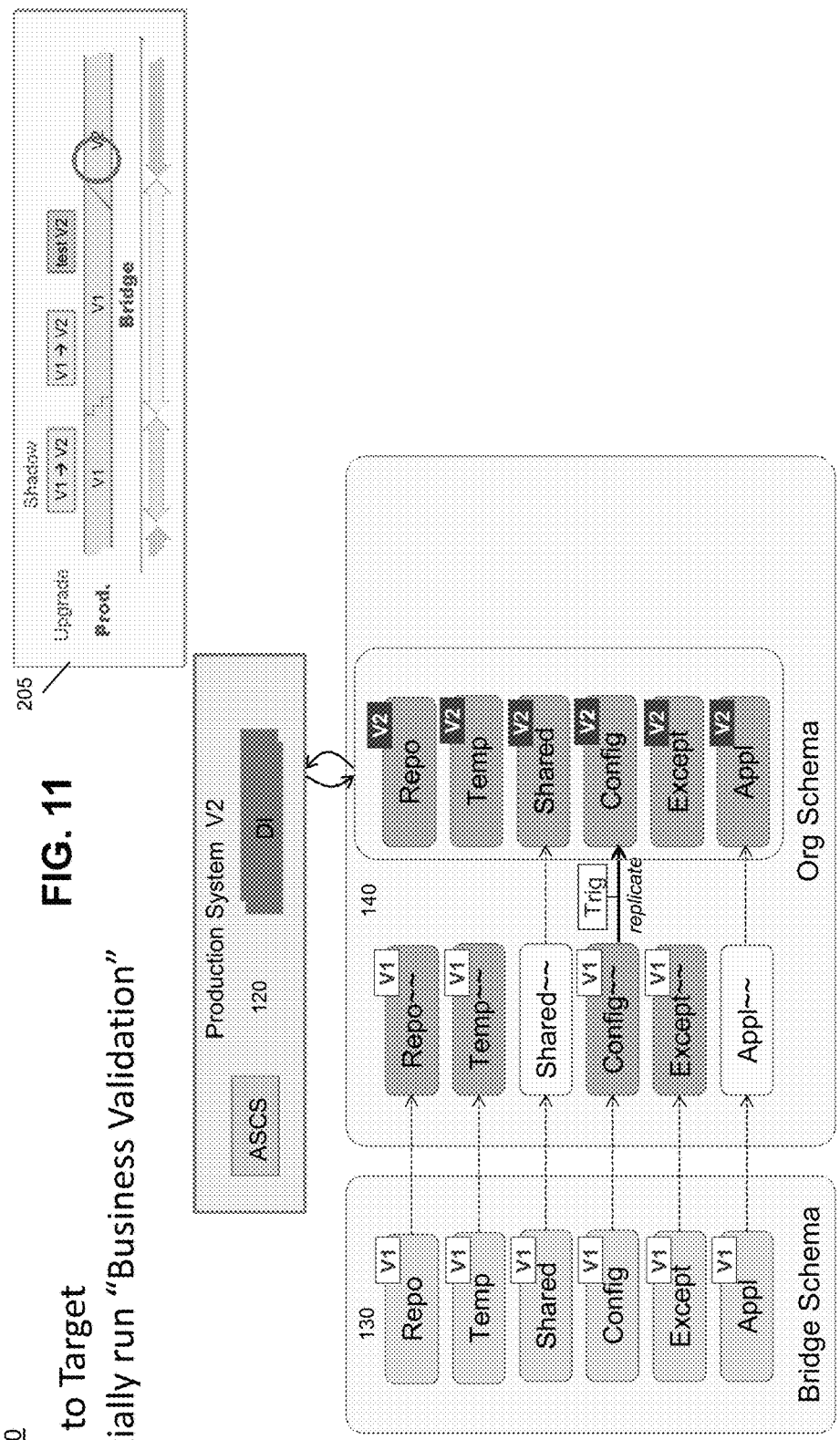

With reference to diagram 1100 of FIG. 11, users of the production system 120 (running V2) can be switched from bridge schema 130 to the original schema 140. Batches are phased out, users are logged off, and queues are run until they become empty.

Figure 12:
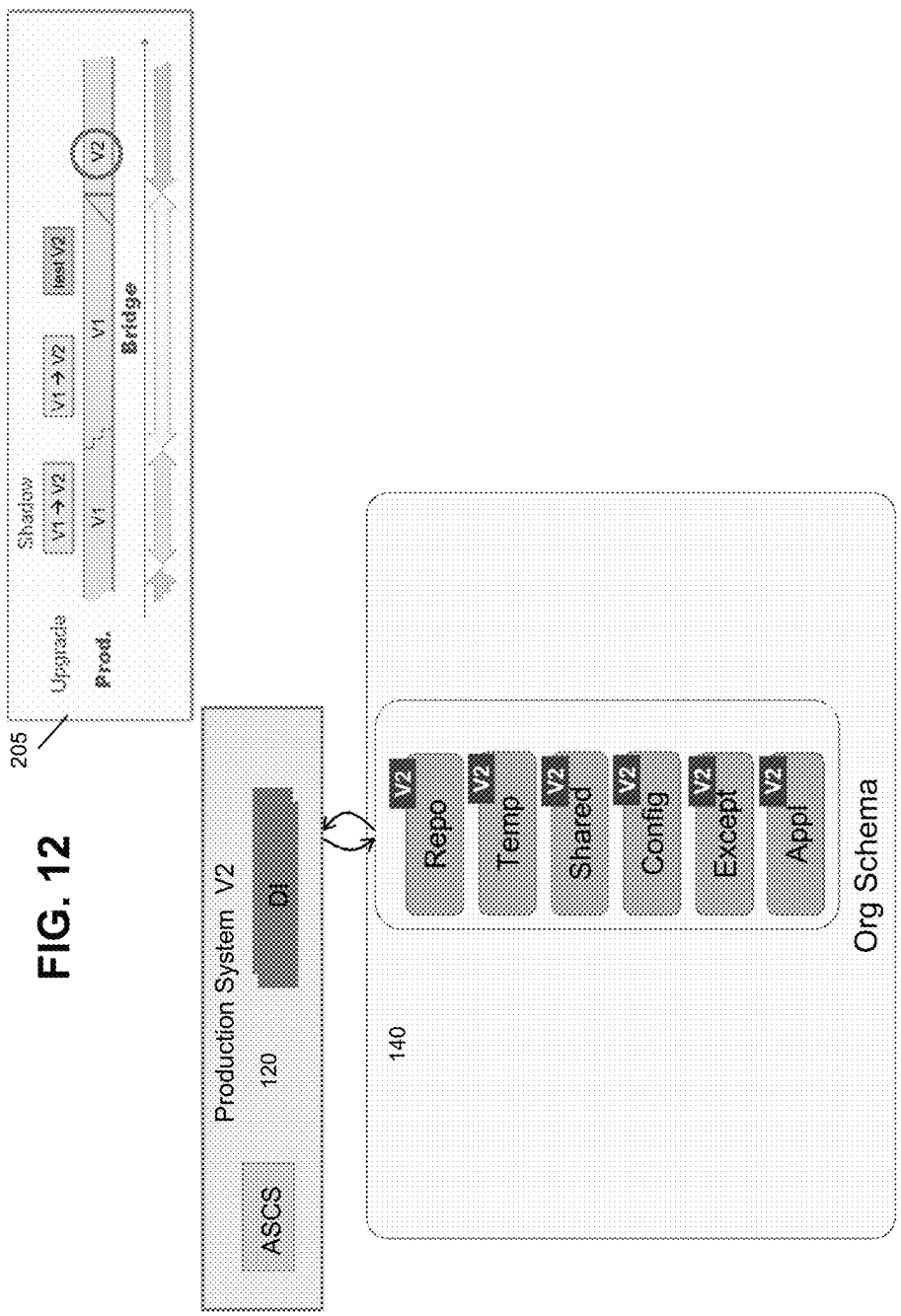

With reference to diagram 1200 of FIG. 12, the target system (production system 120) is next opened for all users. In addition, upgrade artifacts can be cleaned up.

The current subject matter can use information about the table on layers, ABAP and database, and to compare this information between a start configuration and a target configuration. The difference can be computed on a first layer (e.g., the ABAP layer, etc.), namely which fields are new, which are deleted and which fields change the type. Then this difference information can be added, if a field does not change type in a first layer (e.g., the ABAP layer, etc.) but it changes type in a different layer (e.g., the database/SQL layer, etc.) due to, for example, a new first layer to second layer data type mapping. The result can be a complete set of changes done to the table and the knowledge of the change both on the first level (e.g., the ABAP layer, etc.) and the second level (e.g., the database level, etc.).

With these changes, it can then be determined how the type change (or new field) can be handled. There can be various available scenarios. First, the database layer can handle the conversion implicitly. For example, if an INT is inserted insert into a BIGINT field. Second, the database layer can provide a function to do the conversion. For example, the field can be converted using such a function and the new value inserted in its place (e.g., VARCHAR to CLOB and similar conversions, etc.).

In other variations, an own function (i.e., a SQL function or other procedure specifically created for a given conversion requirement, etc.) can be created to do the conversion. One example is the NUMC data type for which new values are created as a right aligned copy of the old value and filled with "0" from the left.

In addition, SQL copy functions can be utilized. SQL copy functions, in this regard, are templates of a function to copy all data from one table (TAB1) with one structure to another table (TAB2) with another structure. The templates can be adjusted for a certain table with the required table structure and type changes. In some cases, the type conversion functions can be built into the code. Further, one SQL copy function can be created for each set of tables to be converted (i.e., a particular SQL copy function can be generated specifically for table TAB1, etc.).

Database triggers can also be used which can act upon operations (e.g., insert, update, delete) in a source table (TAB1) so that the same operation can be implemented on a target table (TAB2). A trigger template can be used that is adjusted for a certain table structure to perform the required structure conversion. Using the template, one trigger can be created for each table to be converted. In other variations, there can be a database trigger for each operation: insert, update and delete for each table to be converted (which is dependent on the particular database).

Table 1 below shows various types of conversion functions and how they can be used.

TABLE 1

| DML Statement/ WHERE clause | Used by | Initial Value Assignment | Explicit Conversion |
|---|---|---|---|
| INSERT INTO "TARGET" (name1, name2, . . .) VALUES(value1, value2, . . .) | Trigger | ( . . . , name-new) VALUES( . . . , '00000000') | ( . . . , namei) VALUES( . . . , NVL(namei, '00000000')) |
| INSERT INTO "TARGET" (name1, name2, . . .) SELECT name1, name2, . . . FROM "SOURCE" | Transfer script | ( . . . , name-new) SELECT . . . , '00000000' FROM . . . | ( . . . , namei) SELECT . . . , NVL(namei, '00000000') FROM . . . |
| UPDATE "TARGET" SET name1 = value 1 WHERE . . . | Trigger | SET name-new = '00000000' | SET namei = TO_FLOAT(namei) |
| WHERE name1 = value1 AND name2 = value 2 . . . | Trigger + Replay | . . . AND name-new = '00000000' | . . . AND name-new = TO_FLOAT(namei) |

NULL values can complicate application development due to the 3-value logic. To get 100% of a table's content a WHERE clause needs to specify WHERE NEW_COLUMN='X' OR NEW_COLUMN< >'X' OR NEW_COLUMN IS NULL. Not every application is prepared to properly handle it. Sometimes application developers decide to set the Initial flag in DDIC rather than changing their code. DDIC in this regard can be characterized as a metadata repository It makes a difference regarding NULL values, if a table is created or altered. When a table is created newly, NOT NULL can be specified, regardless if the Initial Flag in DDIC is set or not. When a table is altered, NOT NULL can be specified only if the Initial Flag in DDIC is set.

NULL values appear in the data of a table only if the field was added via an ALTER TABLE statement, the Initial flag in DDIC was not set by the owner of the table, and/or no conversion took place (when a conversion is done, no NULL values will be written when copying the table data using ABAP).

Conventionally, only the primary key fields that exist in both source and target tables are specified in WHERE clauses. When there are new primary key fields in the target table, the primary key does not need to be fully specified when accessing the target table. However, a fully specified primary key in a WHERE clause can help to improve database performance, because there can only be 1 or 0 rows for such a WHERE clause.

Fully specifying the primary key for the target table can require specifying default (or initial) values for the new key fields of a target table and, in some cases, support for different WHERE clauses for source and target tables.

For queries that select only those rows that satisfy a shortened primary key constraint, primary key field deletions in Fast Data Copy Transfer (FDCT—a SQL statement to copy data from one table to another, etc.) can be supported. For an ORACLE system such a statement would be (given MSGNR would be deleted from a T100 table):

```
SELECT SPRSL, ARBGB, TEXT FROM
  ( SELECT SPRSL, ARBGB, TEXT, ROW_NUMBER( ) OVER
(PARTITION BY SPRSL, ARBGB ORDER BY ARBGB, SPRSL)
    rn FROM T100)
      WHERE rn <= 1;
```

When primary key fields are deleted (e.g. source table has 3 primary key fields, target table has only 2) the cardinality between source and target table rows is no longer 1:1 but n:1. When specifying fully specified primary keys in clone triggers (e.g., Live Clone Triggers, etc.), the deletion of primary key fields can be supported. When all old primary key fields are replaced by new primary key fields, all old rows can be mapped to just one new row.

Figure 13:
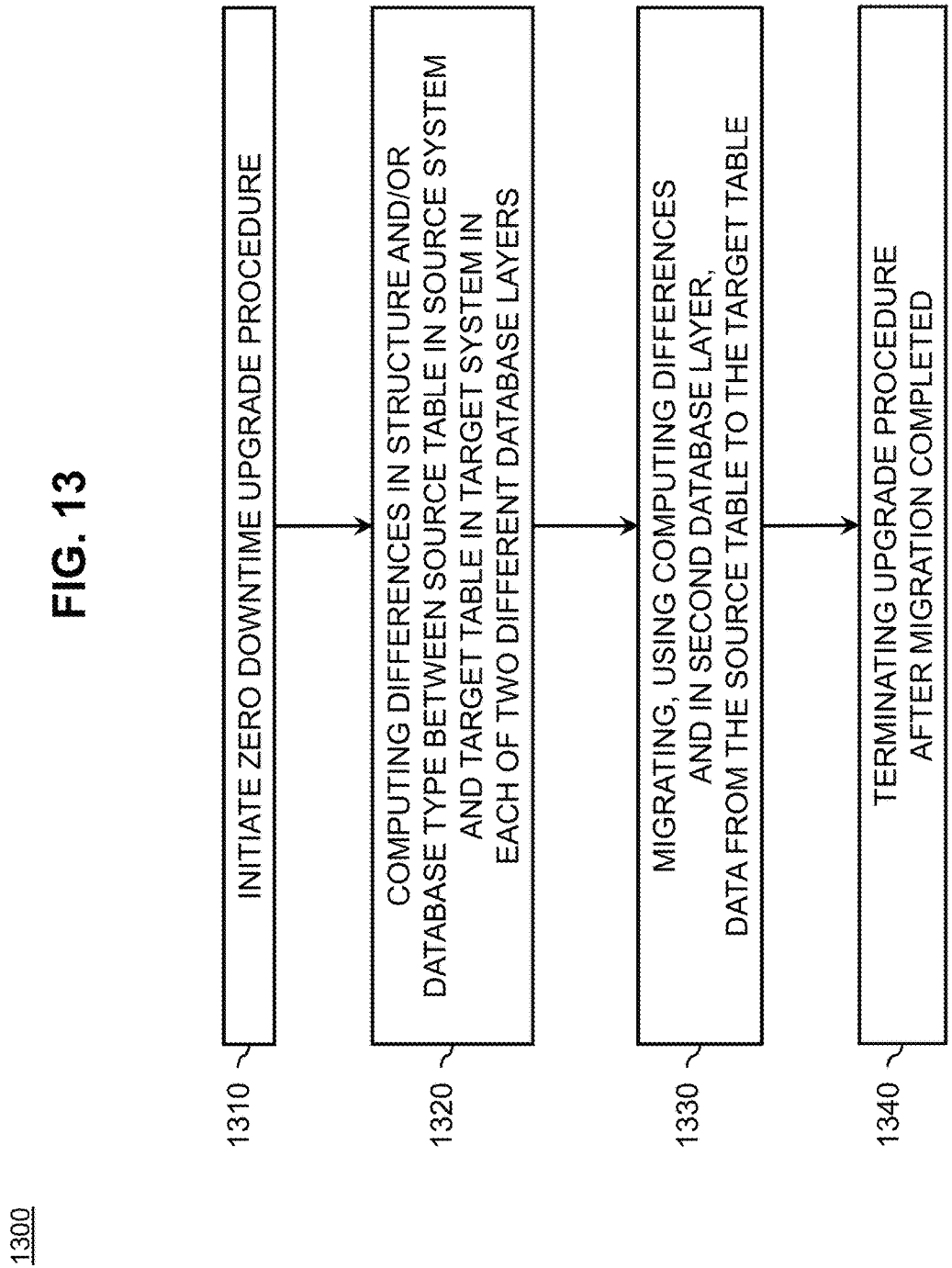
FIG. 13 is a process flow diagram illustrating a zero downtime upgrade procedure.

FIG. 13 is a process flow diagram illustrating a zero downtime upgrade procedure. Initially, at 1310, a zero downtime upgrade of a source system to a target system is initiated. The upgrade procedure prepares software for the target system in parallel to operation of the source system by selectively (i) cloning, for the target system, tables and associated database triggers used by the source system according to a source database schema, (ii) generating new target tables comprising updated software content for use by a bridge database schema, and (iii) selectively sharing tables between the source database schema and the bridge database schema. The source system and the target system operating in a first database layer (e.g., ABAP layer, etc.) and a second database layer (e.g., SQL layer, etc.). Thereafter, at 1320, differences in structure and/or database type between a source table in the source system and a target table in the target system are identified in each of the two different database layers. Using the computed differences, at 1330, data is migrated from the source table to the target table in the second database layer. Later, at 1340, the upgrade procedure is terminated after completion of the migration of the data.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
    initiating a zero downtime upgrade of a source system to a target system, the upgrade procedure preparing software for the target system in parallel to operation of the source system by selectively (i) cloning, for the target system, tables and associated database triggers used by the source system according to a source database schema, (ii) generating new target tables comprising updated software content for use by a bridge database schema, and (iii) selectively sharing tables between the source database schema and the bridge database schema, the source system and the target system operating in a language layer and a database layer, the language layer including a source language layer and a target language layer, and the database layer including a source database layer and a target database layer, the source language layer including a first mapping of data types between the source database layer and the source language layer, and the target language layer including a second mapping of data types between the target language layer and the target database layer;
    computing a first difference in structure and/or database type between a first data element in a source table in the source system and a second data element in a target table in the target system, in the database layer;
    computing a second difference in structure and/or database type between a third data element in the source table and a fourth data element in the target table, in the language layer, wherein the third data element is generated from the first data element in the source table by the first mapping of data types between the source database layer and the source language layer;

migrating, using the first and second computed differences, the first data element and third data element from the source table to the target table in the database layer, the first and second computed differences used to add, delete, and/or change field type of the migrated data; and terminating the upgrade procedure after completion of the migration of the data; wherein at least one of the initiating, the computing, the migrating, and the terminating are implemented by at least one data processor forming part of at least one computing system.

2. The method of claim 1, wherein the language layer is an Advanced Business Application Processing (ABAP) language layer.

3. The method of claim 2, wherein the computing the first and second differences comprises accessing an ABAP data dictionary (DDIC) to identify a structure of the source table in the language layer.

4. The method of claim 1, wherein the database layer uses Structured Query Language (SQL) for managing data.

5. The method of claim 1, wherein the migrating implicitly converts the data of the source table on the database layer.

6. The method of claim 1, wherein the migrating uses a conversion function to convert the data of the source table on the database layer.

7. A system comprising:
a source system comprising at least one data processor and memory;
a target system comprising at least one data processor and memory;
wherein the source system and the target system implement operations comprising:
initiating a zero downtime upgrade of the source system to the target system, the upgrade procedure preparing software for the target system in parallel to operation of the source system by selectively (i) cloning, for the target system, tables and associated database triggers used by the source system according to a source database schema, (ii) generating new target tables comprising updated software content for use by a bridge database schema, and (iii) selectively sharing tables between the source database schema and the bridge database schema, the source system and the target system operating in a language layer and a database layer, the language layer including a source language layer and a target language layer, and the database layer including a source database layer and a target database layer, the source language layer including a first mapping of data types between the source database layer and the source language layer, and the target language layer including a second mapping of data types between the target language layer and the target database layer;
computing a first difference in structure and/or database type between a first data element in a source table in the source system and a second data element in a target table in the target system, in the database layer;
computing a second difference in structure and/or database type between a third data element in the source table and a fourth data element in the target table, in the language layer,
wherein the third data element is generated from the first data element in the source table by the first mapping of data types between the source database layer and the source language layer;
migrating, using the first and second computed differences, the first data element and third data element from the source table to the target table in the database layer, the first and second computed differences used to add, delete, and/or change field type of the migrated data; and
terminating the upgrade procedure after completion of the migration of the data.

8. The system of claim 7, wherein the language layer is an Advanced Business Application Processing (ABAP) language layer.

9. The system of claim 8, wherein the computing the first and second differences comprises accessing an ABAP data dictionary (DDIC) to identify a structure of the source table in the language layer.

10. The system of claim 7, wherein the database layer uses Structured Query Language (SQL) for managing data.

11. The system of claim 7, wherein the migrating implicitly converts the data of the source table on the database layer.

12. The system of claim 7, wherein the migrating uses a conversion function to convert the data of the source table on the database layer.

13. A method for implementation by one or more data processors forming part of at least one computing system, the method comprising:
initiating a zero downtime upgrade of a source system to a target system, the upgrade procedure preparing software for the target system in parallel to operation of the source system by selectively (i) cloning, for the target system, tables and associated database triggers used by the source system according to a source database schema, (ii) generating new target tables comprising updated software content for use by a bridge database schema, and (iii) selectively sharing tables between the source database schema and the bridge database schema, the source system and the target system operating in a language layer and a database layer, the language layer includes a source language layer and a target language layer, and the database layer including a source database layer and a target database layer, the source language layer including a first mapping of data types between the source database layer and the source language layer, and the target language layer including a second mapping of data types between the target language layer and the target database layer;
computing a first difference in structure and/or database type between a first data element in a source table in the source system and a second data element in a target table in the target system, in the database layer;
computing a second difference in structure and/or database type between a third data element in the source table and a fourth data element in the target table, in the language layer,
wherein the third data element is generated from the first data element in the source table by the first mapping of data types between the source database layer and the source language layer;
migrating, using the first and second computed differences, the first data element and third data element from the source table to the target table in the database layer, the first and second computed differences used to add, delete, and/or change field type of the migrated data.

14. The method of claim 13, wherein the differences are computed as part of a zero downtime upgrade procedure.

15. The method of claim 14, wherein the database layer uses Structured Query Language (SQL) for managing data.

16. The method of claim 14, wherein the computing the first and second differences comprises accessing an ABAP data dictionary (DDIC) to identify a structure of the source table.

* * * * *